United States Patent [19]

Luebbe, Jr. et al.

[11] 4,339,504

[45] Jul. 13, 1982

[54] LOW ODOR ELECTROSENSITIVE PAPER

[75] Inventors: Ray H. Luebbe, Jr., Maitland; Frank Miro, Longwood; Frank M. Palermiti, Maitland, all of Fla.

[73] Assignee: Exxon Research & Engineering Co., Florham Park, N.J.

[21] Appl. No.: 197,169

[22] Filed: Oct. 15, 1980

[51] Int. Cl.³ .......................... B32B 23/08

[52] U.S. Cl. .......................... 428/513; 428/204; 428/205; 428/516; 427/388.4; 346/135.1

[58] Field of Search .............. 428/204, 205, 513, 499, 428/516; 346/162, 135.1

[56] References Cited

U.S. PATENT DOCUMENTS

| | | | |
|---|---|---|---|
| Re. 29,427 | 10/1977 | Sekine | 204/2 |
| 3,076,720 | 2/1963 | Rice et al. | 117/15 |
| 3,432,339 | 3/1969 | Howell et al. | 117/132 |
| 3,436,325 | 4/1969 | Aufhauser | 204/159.2 |
| 3,494,826 | 2/1970 | Scheiber | 162/168 |
| 3,496,063 | 2/1970 | Benning | 161/247 |
| 3,551,538 | 12/1970 | Yamamoto et al. | 264/49 |
| 3,676,189 | 7/1972 | Woodward et al. | 117/76 P |
| 3,723,112 | 3/1973 | Luebbe, Jr. | 96/1.2 |
| 3,758,661 | 9/1973 | Yamamoto et al. | 264/230 |
| 3,840,625 | 10/1974 | Yamamoto et al. | 264/41 |
| 3,898,672 | 8/1975 | Yasumori et al. | 346/135 |
| 3,901,769 | 8/1975 | Takatori et al. | 204/2 |
| 3,920,873 | 11/1975 | Diamond | 428/195 |
| 3,925,269 | 12/1975 | Miyoshi et al. | 260/2.5 B |
| 3,935,333 | 1/1976 | Muneoka et al. | 427/49 |
| 3,951,884 | 4/1976 | Miyoshi et al. | 260/2.5 B |
| 4,067,780 | 1/1978 | Fujiwara et al. | 204/2 |
| 4,071,666 | 1/1978 | Garner | 526/1 |
| 4,081,584 | 3/1978 | Akiyama et al. | 428/513 X |
| 4,086,383 | 4/1978 | Yamano et al. | 428/516 X |
| 4,105,449 | 8/1978 | Tanei et al. | 96/1.8 |
| 4,163,075 | 7/1979 | Nakano et al. | 428/328 |

*Primary Examiner*—P. C. Ives
*Attorney, Agent, or Firm*—John Caldwell

[57] ABSTRACT

An improved multilayer electrosensitive recording medium is disclosed comprising a low density polyethylene in one or more of the layers. By using low density polyethylene as a binder in one or more of the layers of an electrosensitive recording medium, the problem of burn-off odor is reduced or eliminated. Pigments such as carbon black and modifiers such as surfactants may also be added to the particular layer.

Particular embodiments are disclosed in which the polyethylene layer or layers are formed by the application of a dispersion of low density polyethylene. The dispersion mixture also includes modifying agents and pigments. After coating the dispersion the solvent is evaporated off and the coating is warmed so that any remaining solvent may be evaporated and the coating particles may form a layer.

28 Claims, No Drawings

LOW ODOR ELECTROSENSITIVE PAPER

BACKGROUND OF THE INVENTION

This invention relates to media suitable for use as electrosensitive papers, more particularly, multi-layer electric or spark discharge papers.

Recording of electrical signals and processes for converting electrical signals directly into visible images have undergone much development since the early efforts of Western Union some 35 years ago. A number of these processes have been developed including dry electric discharge recording, electrolytic recording, and thermal recording. Of particular interest and utility in the area of communications is the electrical discharge recording method used in facsimile and other telecommunication devices.

In an electric discharge or spark discharge recording system an image is formed by an electrical discharge which passes to ground through a sheet comprising multiple layers of optically contrasting materials. The electrical discharge normally emanates from a moving needle-like electrode or stylus and causes a series of perforations in the surface layer to produce a desired optical pattern. These perforations result from a selective removal or destruction of portions of the surface layer which are "melted", "burned" or "exploded" away from the paper to expose portions of the underlying layer. Often the exposed underlying layer is black or blackish-brown and contrasts with the white or grayish-white surface layer.

Many multi-layered electrosensitive papers comprise top layers consisting of thin metal "sheets" and/or synthetic resin(s); and underlying (imaging) layers containing a synthetic resin and carbon black, pigments or other contrast agents.

These papers also normally comprise substrates, such as paper, which provide dimensional stability to their associated layers, and may optionally comprise additional layers such as base layers between the imaging layer and the substrate. Such base layers, if desired, may comprise thin sheets of electrically conductive materials.

These electrosensitive papers are made by creating the desired number and type of layers on the substrate using any of a variety of coating, lamination and/or deposition processes. For example, coating may be accomplished through solvent or dispersion coatings which may subsequently be treated, such as by heating, to effect completion of the desired layer. Please refer to U.S. Pat. Nos. 3,496,063; 3,875,023 (Re. 29,427); 3,898,672; 3,920,873; 3,901,769; 4,105,449; 4,071,666 and 4,067,780 for disclosures of various types of electrosensitive papers and methods for producing same.

It has long been known to coat various substrates, such as paper, with dispersions of polyolefins, such as low density polyethylene. For example, U.S. Pat. No. 3,432,339 discloses a process for coating various substrates, such as paper, with polymers such as polyolefins polymers alone or in combination with rubber latex. According to this patent, finely divided polyolefinic polymers having an average particle size from about 2 to 30 microns in an inert carrier liquid such as water are used. The resulting dispersion is applied to the surface of the substrate and then heated to evaporate the inert liquid. In accordance with one of the preferred embodiments, a minor amount of rubber latex is dispersed along with the finely divided polyolefinic polymer. Similarly, U.S. Pat. No. 3,676,189 discloses the coating of a polyolefinic surface, such as a polyolefin coated photographic paper, with aqueous silica sol, an acid stable and water insoluble film forming material (such as aqueous polyethylene emulsion), surface active agents, and an acid. This method is described as obviating the need for curing at elevated temperatures, such as 50° C., as suggested in prior art organic film forming methods.

Coatings which may be satisfactory for other purposes, such as to improve water resistance, increase activity and alter other properties of a given substrate, are recognized as being inoperative or disadvantageous for use as layers in electrosensitive papers. A suitable composition for use in forming one or more layers of an electrosensitive paper must, in combination with the other layers of that paper, produce a product which exhibits uniform sensitivity, resistance to discoloration, suitable pattern resolution, uniform and predictable electrical conductivity/resistance, and resistance to the formation of offensive smoke and/or odors during recording. As mentioned above, the art has experimented with a wide variety of materials, including many resins, metals and fibers, and methods of processing same, for the purpose of achieving suitable end product properties. Various attempts to improve properties of given electrosensitive papers are described in U.S. Pat. No. 3,920,873 and U.S. Pat. No. 3,935,333. In U.S. Pat. No. 3,920,873 fragrance oils are added to the underlying layer of the recording medium to mask unpleasant odors formed during recording, while alternatively, loose or stray surface fibers, which are described as aiding in the formation of recording odor and odor persistance, are reduced through a calendaring process which is intended to decrease the number of stray surface fibers. Similarly, U.S. Pat. No. 3,935,333 discloses an electrosensitive recording medium wherein a substrate such as polyethylene is covered by an underlying opaque conductor layer and a semi-conductive surface layer. The semi-conductive surface layer, which preferably comprises a mixture of metallic oxides and polymeric binders, is intended to lower the electric voltage necessary to record an image, thereby reducing the amount of smoke and odor released during recording.

Electrosensitive recording papers comprising surface and intermediate layers containing substantial amounts of synthetic polymers have experienced considerable success in the electrosensitive paper market in spite of the offensive odors which are generated by such papers during recording. Applicants believe that a major cause of burn-off odor created during the electrical discharge recording process is due to the degradation of polymers which are contained in one or more layers of such paper. It is, of course, well known that various polymers produce offensive odors upon heating or degradation. For example, it is known that above 635° F. polyethylene breaks down and begins to generate offensive odors. (See U.S. Pat. No. 3,076,720, column 4, lines 17–20.) Similarly, as discussed above, it is not presently known what other factors may be involved in producing offensive odors or in controlling those odors once they are formed during recording with electrosensitive papers. Thus, while other nonconductive binders, such as polyvinyl alcohol, polyvinyl acetate, polyvinyl chloride, ethyl cellulose, gelatin, butadiene-styrene copolymers, vinyl acetate-crotonic acid copolymers, polymethyl methacrylate, polyethyl methacrylate and the like have been suggested, electrosensitive papers incorporating such binders have yet to optimize the desired properties referred to above in combination with the desired low odor characteristics.

For disclosures relating to the use of various polyolefins, including high and low density polyethylenes, in the paper coating area please refer to U.S. Pat. Nos. 3,494,826; 3,436,325; 3,551,538, 3,758,661; 3,840,625. Of course the factors affecting the selection of a particular binder are complicated by the fact that interactions between particular binders and the other selected components of the electrosensitive paper system are likely to alter the performance of the resultant product. For example, carbon black, even in low amounts, is known to color various polyolefins, such as polyethylene, and might be expected to interfere with pattern resolution by contaminating a top layer containing a carbon black-sensitive binder. Similarly, other incompatabilities may be experienced in a given electrosensitive paper system which could be accurately predicted by examining the characteristics of the individual components thereof. (See *Modern Plastics Encyclopedia* 1974–1975, page 82.)

SUMMARY OF THE INVENTION

The present invention describes a novel electrosensitive recording medium which exhibits surprisingly low odor characteristics during recording while nonetheless exhibiting suitable sensitivity, resistance to discoloration, suitable pattern resolution, and predictable and uniform electrical conductivity/resistance. This novel electrosensitive recording medium comprises a low density polyethylene binder which is used in at least one of the layers, and preferably at least in the inner layer of the disclosed electrosensitive recording material. While it is not fully understood how the use of low density polyethylene reduces odor generated during recording, it is presently theorized that the degradation of the low density polyethylene proceeds in a manner which does not produce volatile end products which are perceived as having offensive odors. It is further believed that electrosensitive paper utilizing a low density polyethylene binder in accordance with the present invention exhibits greater resistance to odor formation even when conventional odor-forming materials are used in other layers, such as the underlying layer, of the recording medium. It is theorized that the presence of polyethylene may in some way mask or otherwise interfere with the generation of odors which might otherwise be formed from the degradation of layers containing other binder materials. One embodiment of a top coat for use in the electrosensitive recording medium of the present invention is applied as an aqueous dispersion in which the solids consist of 16 to 25 percent low density polyethylene, 75 to 84 percent pigment, typically titanium dioxide and zinc oxide, with 0 to 25 percent, based on the pigment, modifying agents, such as dispersing aids and surfactants, and the remainder water. In accordance with this embodiment of this invention, these aqueous dispersions are applied as top coats, which are then coalesced at temperatures of about 100° C. or higher.

Alternatively, a top coat in accordance with the present invention may be applied as a non-aqueous, organic solvent dispersion which is produced by dispersing a given amount of pigment and polyethylene in the non-aqueous, organic solvent. If desired, a co-binder may be included in that solvent. In this embodiment, low density polyethylene comprises 60 to 100 percent of the binders in this solvent while the co-binder, such as a synthetic microcrystalline wax, may comprise up to 40 percent of the total binders. In this embodiment, the pigment to binder ratio should be between 3:1 and 8:1, and preferably about 5:1.

In alternate embodiments of the present invention, aqueous inner coats may be employed in producing electrosensitive paper in accordance with the present invention. These inner coats may be used alone or in combination with the top coats of the present invention. These inner coats may be applied as aqueous dispersions in which the solids consist essentially of 33 to 95 percent low density polyethylene, 5 to 67 percent conductive carbon black, and no more than 25 percent modifiers based on the pigment, such as surfactants and dispersion aids; the remainder is water. Alternatively, in a preferred method, inner coats in accordance with the present invention may be applied using nonaqueous solvent dispersions. Such inner coats generally comprise amounts of pigment and binder materials so as to give pigment to binder ratios such as are used for aqueous dispersions. To produce an inner coat in accordance with this embodiment, the pigment, which is preferrably conductive carbon black, and the binder are each separately mixed in an organic solvent such as an isoparaffinic kerosene cut hydrocarbon to disperse the pigment and to form a polymer dispersion by heating an amount of low density polyethylene (in bead form) to dissolve the polyethylene in the solvent and then cooling to form a dispersion of fine particles. The resulting mixtures are then combined, mixed, and applied over a base layer and dried at elevated temperatures, as for example, about 115° C. An alternate embodiment may be utilized in which the pigment and binder materials are mixed together in the same process and are not blended separately.

Finally, a novel base coat is also disclosed which may be applied as an aqueous dispersion in a pigment to binder ratio of approximately 8:5.

Accordingly, a primary object of the present invention is the provision of novel, low-odor electrosensitive recording media. It is a further object of the present invention to produce an electrosensitive paper having a surface layer which is formed through the application of a dispersion of low density polyethylene, pigments, and a minor amount of surfactant.

It is a further object of the present invention to provide improved electrosensitive papers having at least one inner layer which is formed by the application of a dispersion of low density polyethylene, pigment, and a minor amount of surfactant.

A further object of the present invention is the provision of an inexpensive electrosensitive paper.

These and further objects of the present invention become apparent from the following, more detailed description.

DESCRIPTION OF THE PREFERRED EMBODIMENTS

While the present invention is hereinafter described in terms of specific examples, one of ordinary skill in this art will recognize that departures may be made from the specific terms of these examples without departing from the spirit and scope of the present invention, which is more particularly defined in the appended claims. As used herein, the term low density polyethylene, unless otherwise noted, refers to polyethylene having densities less than 0.94 g/cm$^3$. Further, as used herein, the term modifiers is intended to refer to surfactants, dispersing aids, lubricants, and antistatic agents, such modifiers being compositions having uses which are well known to one skilled in the art, and which may be used in accordance with their known properties to the extent that those properties are found not to unduly interfere with the properties of the end products of the present invention. Further, as used herein, the term "inner coat" or "inner layer" is intended to refer to the layer immediately beneath the surface layer. As used herein, the term "base coat" or "base layer" is intended to refer to the layer below the inner layer and above the substrate in a three layer structure. Finally, as used herein, the term "top coat", "top surface", "top layer" or "surface layer" shall mean that layer which comprises the exterior surface of the electrosensitive recording medium and which is perforated in whole or in part during the electric discharge recording process. Finally, one of ordinary skill in this art appreciates that while in the above description and in the following examples pigments have been disclosed which will provide substantially white surface layers and substantially black inner layers, one of ordinary skill in the art may choose to provide a black surface layer and white inner layer for recording purposes, in which event corresponding alterations in the pigment to binder ratios of the top and inner layers may be accomplished without departing from the scope of the present invention. Similarly, pigments other than conductive carbon black and titanium dioxide and/or zinc oxide may be utilized to provide coloring to the top coat and inner coat, provided optical contrast characteristics are retained between said coats. Finally, one of ordinary skill in the art will recognize that in the following examples other organic solvents may be used in place of the isoparaffinic solvents disclosed in the Examples, which organic solvents may include aromatic and n-parafinic solvents as well as alcohols.

The following are specific examples offered to clarify the invention and describe particular embodiments. While some of the following examples may show specific combinations of base coat, intermediate coat and top coat, it is to be understood that a particular coating composition may be utilized with other coating compositions to create a wide variety of combinations, e.g., the top coat of Example 1 may be used with the inner coat of Example 8. As used hereinafer, unless otherwise specified, base coats are applied from 2 to 20 pounds per 3,000 square feet; inner coats are applied from 2 to 20 pounds per 3,000 square feet; and top coats are applied from 5 to 20 pounds per 3,000 square feet. Further, as used herein, all percents referred to are percents by weight.

As used herein with reference to aqueous dispersions, the term "non-aqueous portion" shall refer to all materials other than water in said dispersion; in this context, "% solids" refers to the given material as a percent of all materials other than water which constitute this non-aqueous portion. As used herein with reference to non-aqueous dispersions, the term "non-solvent portion" shall refer to all materials other than solvents which are contained within the disclosed dispersions, such as pigments, binders, co-binders and modifying agents. Unless otherwise specified, the term "% solids" as used in connection with non-aqueous dispersions refers to the given material as a percentage of the total non-solvent portion.

COATS CONTAINING LOW DENSITY POLYETHYLENE APPLIED IN AQUEOUS FORM

Top Coats

Example 1

The standard base coat was made by combining 3% ethyl cellulose (Ethyl cellulose N200, from Hercules), 70% toluene, 15% ethanol, and 12% of a conductive carbon black (Vulcan XC-72, from Cabot Corp.), giving a pigment-binder ratio of 4:1 with total solids of 15%. This mixture was ground in a ball mill for 18 hours and the resulting dispersion was coated onto a paper substrate by a wire wound rod method (the Meyer Rod method). The coated substrate was air dried for 1 minute at room temperature, then dried for 1 minute at 100° C.

The standard inner coat was then made from 20% polystyrene, 68% toluene, 8% methylethyl ketone, and 4% of a conductive carbon black (Vulcan XC-72), giving a pigment-binder ratio of 1:5 with total solids of 24%. This mixture was ground in a ball mill for 18 hours and the resulting dispersion was coated on top of the base coat by a wire wound rod method. The coated material was air dried for 1 minute at room temperature, then dried for 1 minute at 100° C.

A top coat was then made by mixing 31.2% of a low density emulsifiable polyethylene (Celca-Rez 8166, from Celanese Corp., density is 0.93 g/cm$^3$), 22.4% titanium dioxide, 15% zinc oxide, 0.2% of a sodium hexametaphosphate surfactant (Calgon, from Calgon Corp.), and 31.2% water. This mixture was ground in a ball mill for 16 hours. The resulting dispersion was coated on top of the inner coat by a wire wound rod method and air dried for 1 minute at room temperature, and then dried for 1 minute at 100° C.

Example 2

The standard base coat and standard inner coat were fabricated as in Example 1 and applied to a paper substrate. The top coat was made by mixing 20.4% of a low density emulsifiable polyethylene (Celca-Rez 8166), 24.6% titanium dioxide, 16.4% zinc oxide, 0.4% of an octylphenoxy polyethoxyethanol (Triton X-100, from Rohm & Haas Co.) as a pigment dispersing aid, 1.4% of a sodium salt of a polymeric carboxylic acid (Tamol 850, from Rohm and Haas Co.), and 36.8% water. The mixture was ground in a ball mill for 16 hours and then coated on top of the inner coat by a wire wound rod method and air dried for 1 minute at room temperature, then for 1 minute at 100° C.

Example 3

The standard base coat and standard inner coat were made and applied to a paper substrate as in Example 1. The top coat was fabricated by mixing 20.7% of a low density emulsifiable polyethylene (Polymul MS-40, from Diamond Shamrock), 24.9% titanium dioxide, 16.6% zinc oxide, 0.4% Calgon as a surfactant, and 37.4% water. Coating was accomplished as in Example 1.

Example 4

The standard base coat, standard inner coat and paper substrate were used as in Example 1. The top coat was made from 26.0% of a low density emulsifiable polyethylene (Celca-Rez 8166), 23.1% titanium dioxide, 16.5% zinc oxide, 0.4% Calgon, and 34.0% water. The mixture was ground in a ball mill for 15 hours. The resulting dispersion was applied as in Example 1.

Example 5

The standard base coat and standard inner coat were made as in Example 1 and coated onto a paper substrate. The top coat was made from 11.0% of a low density emulsifiable polyethylene (Celca-Rez 8166), 23.1% titanium dioxide, 16.5% zinc oxide, 0.4% Calgon, and 34.0% water. The mixture was ground in a ball mill for 16 hours and the resulting dispersion was applied as in Example 1.

Example 6

A standard base coat and standard inner coat were made and applied to a paper substrate as in Example 1. The top coat was made from 16.7% of a low density emulsifiable polyethylene (Poly EM 40, from Rohm and Haas Co.), 16.0% titanium dioxide, 10.7% zinc oxide, 56.3% water, and 0.3% methyl cellulose (Methocel Hg 400, from Hercules). This mixture was ground in a ball mill for 16 hours. The resulting dispersion was applied as a top coat as in Example 1.

The electrosensitive recording material fabricated using layers of the compositions noted in this example was judged to give especially low odor.

Although specific polyethylenes were used in the above Examples 1–6, other low density polyethylenes may be used in these top coat formulations. Such polyethylenes include Poly EM 12 and Poly EM 20 from Rohm and Haas Co., Polymul C-66 from Diamond Shamrock, and Epolene E-11 (density is 0.939) from Eastman Chemical.

Inner Coat

Example 7

A standard base coat was mixed and applied to a paper substrate as in Example 1. An inner coat was made by mixing 70.4% of a low density emulsifiable polyethylene (Celca-Rez 8166), 0.4% polyvinylpyrrolidone (PVP K-30, from GAF), 3.3% of a conductive carbon black (Vulcan XC-72, from Cabot Corporation), and 25.9% water. The mixture was ground in a ball mill for 16 hours and the resulting dispersion was applied to a coated substrate as the inner layer.

A standard top coat was made of 6% polyvinyl acetate, 18% zinc oxide, 12% titanium dioxide, and 64% methanol, giving a pigment-binder ratio of 5:1 with total solids of 36%. This mixture was ground in a ball mill for 16 hours and applied as a top coat by the wire wound rod method as previously described in Example 1.

Inner and Top Coats

Example 8

A standard base coat on a paper substrate was used. An inner coat was made by mixing 58.6% of a low density emulsifiable polyethylene (Celca-Rez 8166), 0.5% polyvinylpyrrolidone (PVP K-30), 4.6% of a conductive carbon black (Vulcan XC-72), and 36.3% water. The mixture was ground in a ball mill for 16 hours and the dispersion was applied as an inner coat by the previously described method. A top coat was made as in Example 4 and applied as in Example 1.

All Polyethylene Layers

Example 9

A base coat was made by mixing 4.9% of a low density emulsifiable polyethylene (Celca-Rez 8166), 7.9% of a conductive carbon black (Vulcan XC-72), 1.6% Triton X-100, and 85.6% water. The mixture was ground in a ball mill for 16 hours. The dispersion was applied to a paper substrate by a wire wound rod method and air dried for 1 minute at room temperature, and then dried at 100° C. for 1 minute.

An inner coat was made by grinding together 82.0% of a low density emulsifiable polyethylene (Celca-Rez 8166), 0.7% polyvinylpyrrolidone (PVP K-30), 6.5% of a conductive carbon black (Vulcan XC-72), and 10.8% water in a ball mill for 16 hours. The dispersion was applied as an inner coat and air dried to 100° C.

A top coat was made and applied as in Example 1.

COATS CONTAINING LOW DENSITY POLYETHYLENE APPLIED IN NON-AQUEOUS FORM

Top Coat

Example 10

To construct a top coat, first about 56 ml. of an isoparaffinic kerosene cut hydrocarbon (Isopar G, from Exxon Corp.), 4.5 grams of titanium dioxide and 3.0 grams of zinc oxide were placed in a 250 ml. polyethylene bottle with 600 grams of 3/16", type 440 stainless steel balls. Milling was continued for 16 hours.

A second mixture was made with about 56 ml. of Isopar G, 5.5 grams of a low density polyethylene (Polyethylene DYLT, from Union Carbide), and 2.0 grams of a Fischer-Tropsch synthetic microcrystalline wax (Paraflint H-1, from Moore and Munger). The polyethylene and Paraflint H-1 were dissolved in the Isopar G by heating to 100° C. and stirring. The stirring bar was removed and the mixture was allowed to cool. This second mixture was added to the first mixture and milled for an additional 16 hours.

The resulting dispersion was suitable for use as a top coat applied on a variety of inner coats with a No. 16 rod. Drying was accomplished at a temperature of about 115° C. for about 5 minutes.

Inner Coat

Example 11

An inner layer with a binder-carbon ratio of 1:1 was constructed by first milling together 56 grams of Isopar G and 7.5 g of a carbon black (Vulcan C, from Cabot Corp.) for 16 hours as in Example 10. A second mixture was made by dissolving 5.5 grams of Polyethylene DYLT and 2.0 grams of Paraflint H-1 in about 56 ml. of Isopar G at 100° C. The second mixture was allowed to cool, added to the first mixture, and milled for an additional 16 hours as in Example 10.

The dispersion may be coated onto a base coat using a No. 36 wire wound rod and dried at 115° C. for about 5 minutes. This intermediate coat is coated with a suitable top coat dispersion and dried at 105° C. for about 5 minutes.

Example 12

Repeat the process as in Example 11 but heat the dispersion to be used for the inner coating to 65° C., hold for 4 hours, and cool to room temperature prior to coating.

Example 13

To construct an inner layer with a binder-carbon ratio of 5:1, 2.5 grams of Vulcan C was milled with 56 ml. of Isopar G as in Example 10 for 4 hours. A second mixture was made by dissolving 9.3 grams of Polyethylene DYLT and 3.2 grams of Paraflint H-1 in 56 ml. of Isopar G at 115° C. The second mixture was allowed to cool to room temperature, added to the first mixture and milled for an additional 16 hours.

Coating and drying are accomplished as in Example 11.

Example 14

To construct an inner layer with a binder-carbon ratio of 10:1, repeat the process as in Example 11 but with the following amounts of materials: 10.2 grams of Polyethylene DYLT, 3.4 grams of Paraflint H-1, and 1.4 grams of Vulcan C.

Example 15

Repeat the process as in Example 13, but substitute 2.5 grams of Sterling R, (from Cabot Corp.) as the carbon black instead of 2.5 grams of Vulcan C.

Example 16

Repeat the process as in Example 13, but substitute 2.5 grams Black Pearls L (from Cabot Corporation) as the carbon black instead of 2.5 grams of Vulcan C.

For the above explained examples the preferred coating weights are 2–20 lb./3000 sq. ft. for the base coat in Examples 4–9 and the inner coat in Examples 5–11. A preferred range for the top coat in Examples 6–14 is 5–20 lb./3000 sq. ft.

I claim:

1. An electrosensitive, spark discharge recording medium for use with a spark discharge recording apparatus to form optical images thereon in response to pre-selected spark discharge patterns, comprising:
- paper;
- at least one inner layer disposed over said paper to substantially cover said paper; and
- a surface layer substantially covering said inner layer, said surface layer comprising a material which optically contrasts with said inner layer, said material comprising low density polyethylene and at least one pigment; said surface layer being disposed over said inner layer such that portions of said surface layer are selectively removed in response to said spark discharge patterns to expose portions of said at least one inner layer;

said spark discharge recording medium being substantially free of objectionable odors during formation of said optical images.

2. An electrosensitive recording medium as in claim 1 further comprising said at least one inner layer comprising low density polyethylene.

3. An electrosensitive recording medium as in claim 1 further comprising a base coat disposed between said paper and said at least one inner layer, said base coat comprising low density polyethylene.

4. An electrosensitive recording medium as in claim 1 wherein said surface layer is applied as an aqueous dispersion.

5. An electrosensitive recording medium as in claim 4 wherein said aqueous dispersion comprises a non-aqueous portion comprising from about 16 to about 25% low density polyethylene.

6. An electrosensitive recording medium as in claim 5 wherein said non-aqueous portion further comprises from 75 to about 84% pigments.

7. An electrosensitive recording medium in accordance with claim 1 wherein said surface layer is applied as a non-aqueous dispersion.

8. An electrosensitive recording medium as in claim 7 wherein said dispersion comprises a binder portion, said binder portion comprising from about 60 to about 100% low density polyethylene.

9. An electrosensitive recording medium as in claim 8 wherein said binder portion comprises 0 to 40% co-binder.

10. The medium of claim 9 wherein said co-binder is a microcrystalline wax.

11. The medium of claim 8 wherein the pigment to binder portion ratio is between 3:1 and 8:1.

12. The medium of claim 11 wherein the pigment to binder portion ratio is 5:1.

13. An electrosensitive recording medium as in claim 1 further comprising a base coat disposed between said paper and said at least one inner layer, said base coat applied as an aqueous dispersion comprising pigment and low density polyethylene.

14. An electrosensitive recording medium as in claim 1 further comprising a base coat disposed between said paper and said at least one inner layer, said base coat applied as an aqueous dispersion comprising pigment and low density polyethylene, said aqueous dispersion having a pigment:binder ratio of about 8:5.

15. An electrosensitive, spark discharge recording medium for use with a spark discharge recording apparatus to form optical images thereon in response to preselected spark discharge patterns, comprising:
- paper;
- at least one inner layer disposed over said paper to substantially cover said paper, said at least one inner layer comprising low density polyethylene; and
- a surface layer substantially covering said inner layer, said surface layer comprising material which optically contrasts with said inner layer, said surface layer disposed over said inner layer such that portions of said surface layer are selectively removed in response to said spark discharge patterns to expose portions of said at least one inner layer, said spark discharge recording medium being substantially free of objectionable odors during formation of said optical images.

16. An electrosensitive recording medium as in claim 15 further comprising a base coat disposed between said paper and said at least one inner layer, said base coat comprising low density polyethylene and a conductive pigment.

17. The electrosensitive recording medium of claim 16 wherein said base coat is applied as an aqueous dispersion having a pigment:binder ratio of about 8:5.

18. An electrostatic recording medium as in claim 15 wherein said at least one inner layer is applied as an aqueous dispersion.

19. An electrosensitive recording medium as in claim 16 wherein said at least one inner layer is applied as a nonaqueous dispersion.

20. An electrosensitive recording medium as in claim 18 wherein said aqueous dispersion comprises a nonaqueous portion comprising from about 33 to about 95% low density polyethylene.

21. An electrosensitive recording medium as in claim 20 wherein said non-aqueous portion further comprises from about 5 to about 67% pigment.

22. An electrosensitive recording medium as in claim 21 wherein said pigment comprises carbon black.

23. The medium of claim 19 wherein said inner layer is applied as an organic solvent dispersion.

24. An electrosensitive recording medium as in claim 23 wherein said at least one inner layer is applied as a dispersion comprising a paraffinic hydrocarbon solvent.

25. An electrosensitive recording medium as in claim 24 wherein said paraffinic hydrocarbon is an isoparaffinic hydrocarbon.

26. The medium of claim 24 wherein said dispersion further comprises a kerosene solvent.

27. An electrosensitive recording medium as in claim 23 wherein said dispersion comprises an alcohol solvent.

28. An electrosensitive recording medium as in claim 23 wherein said dispersion comprises an aromatic hydrocarbon solvent.

* * * * *